R. G. CLYNE.
STAVE RESAWING AND JOINTING MACHINE.
APPLICATION FILED AUG. 23, 1917.
1,321,285.
Patented Nov. 11, 1919.
5 SHEETS—SHEET 3.
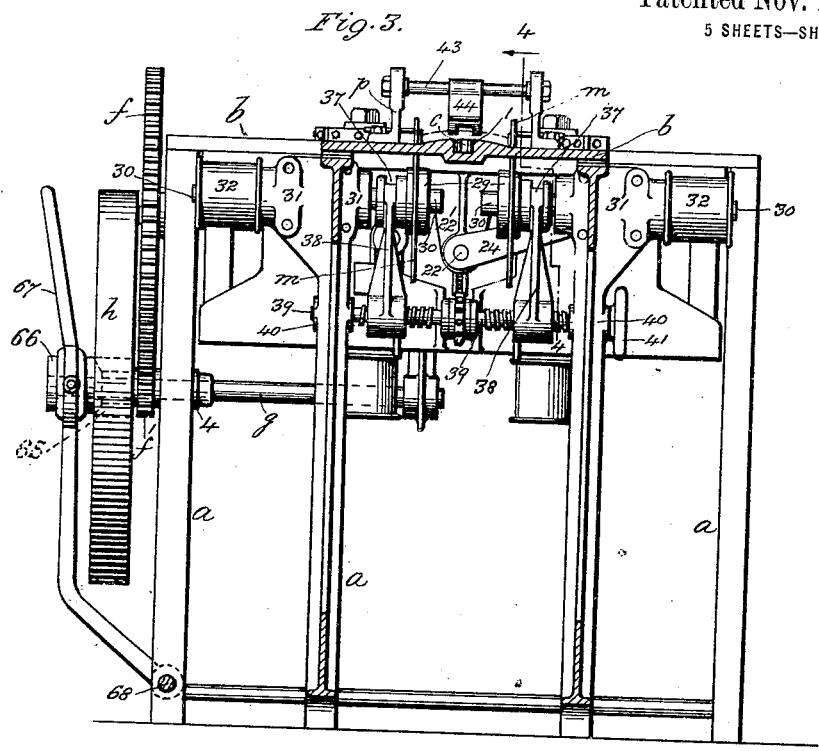
INVENTOR.
Robert G. Clyne.
BY
ATTORNEY.

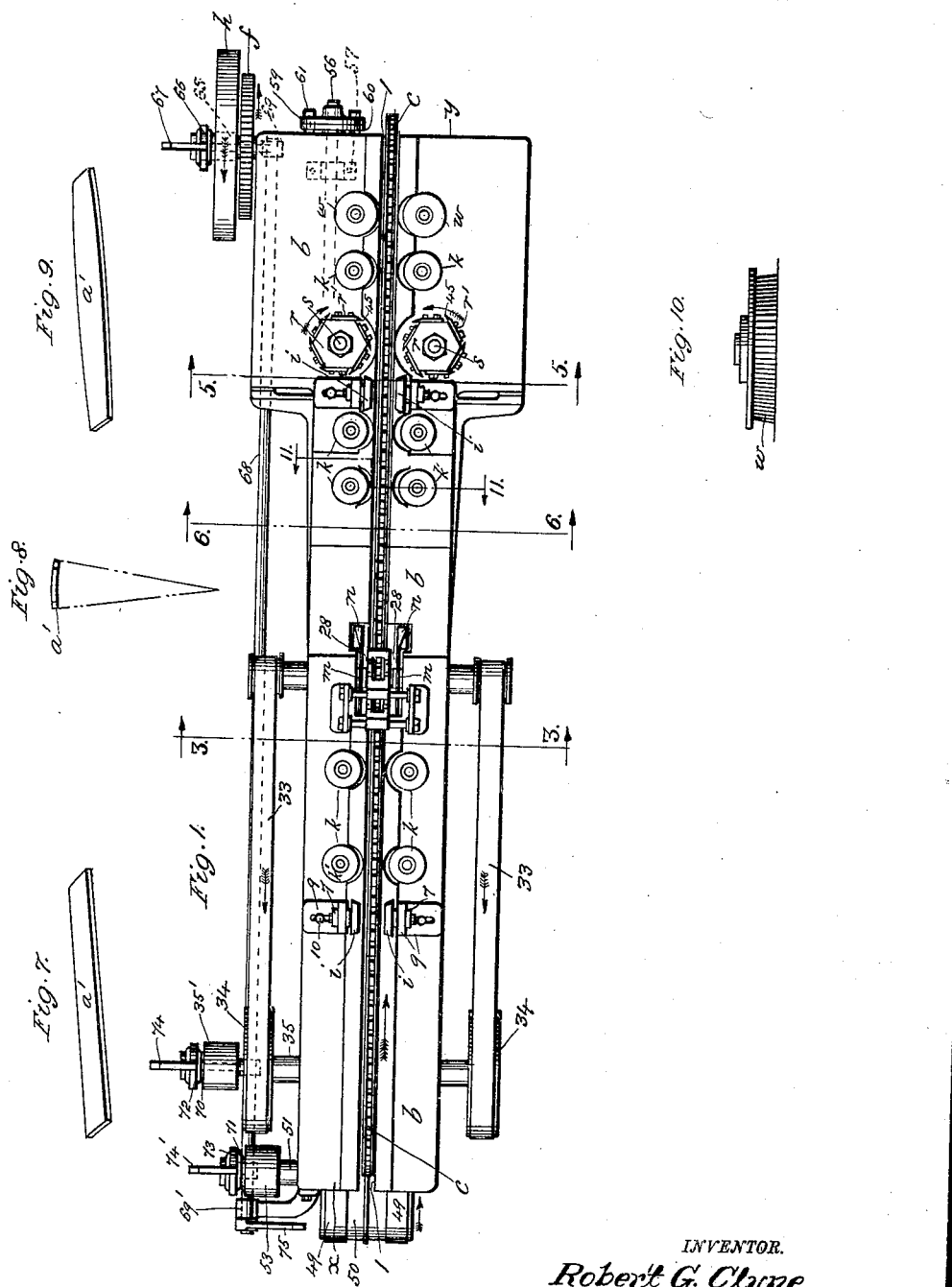

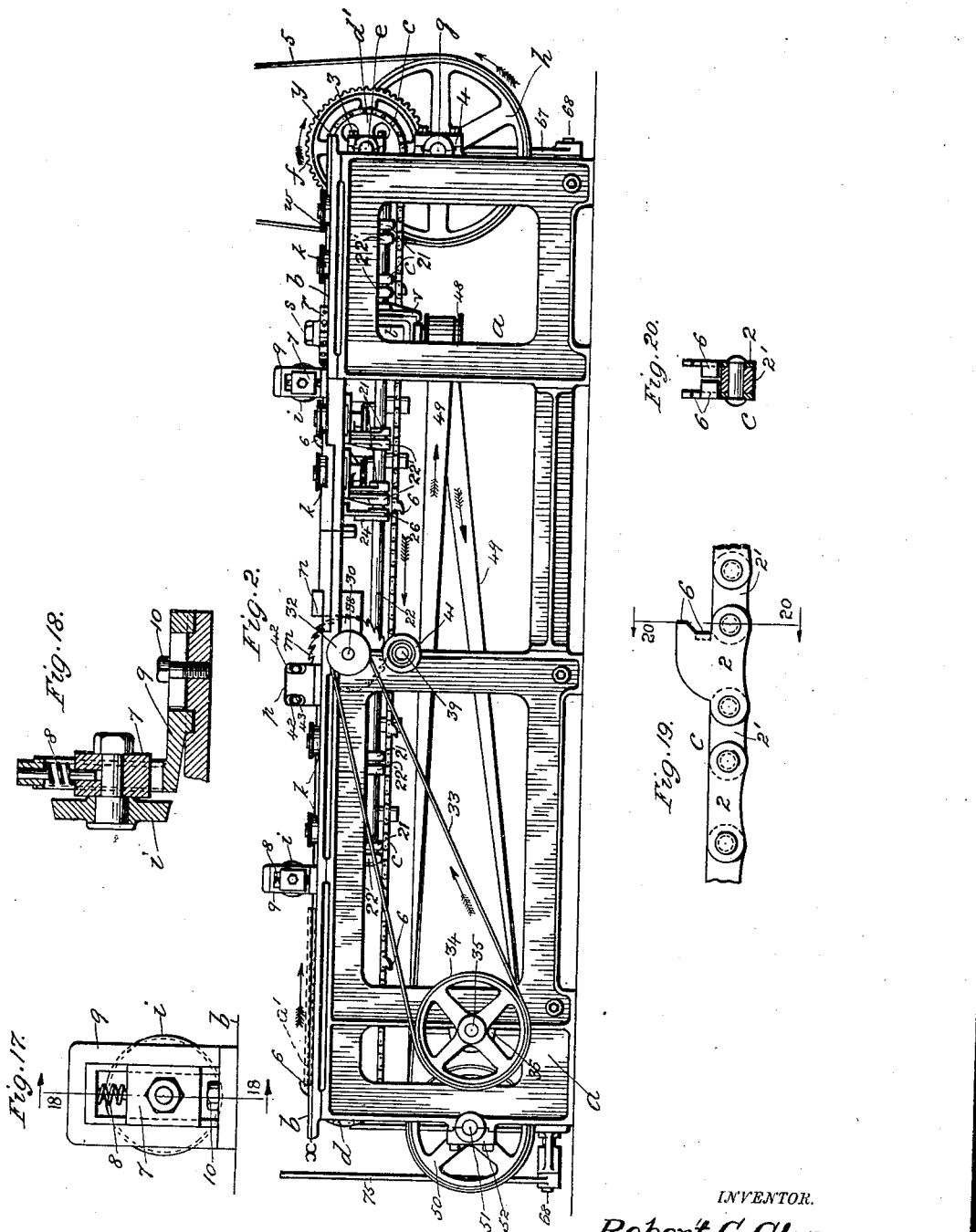

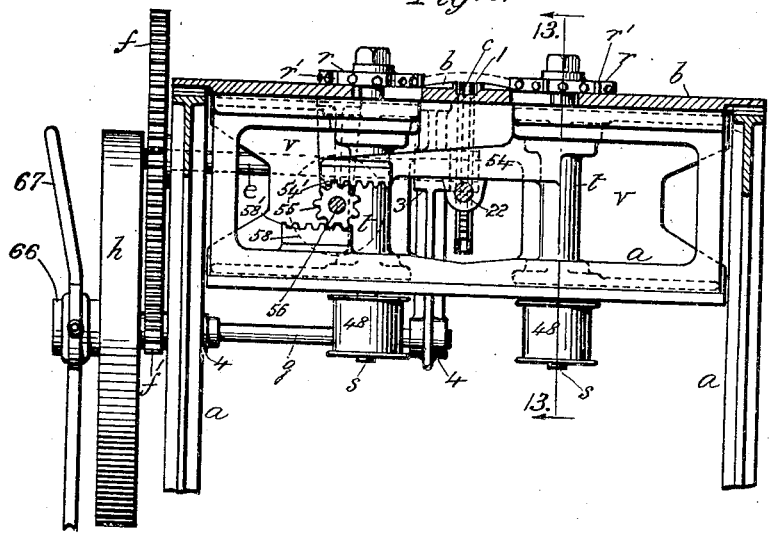

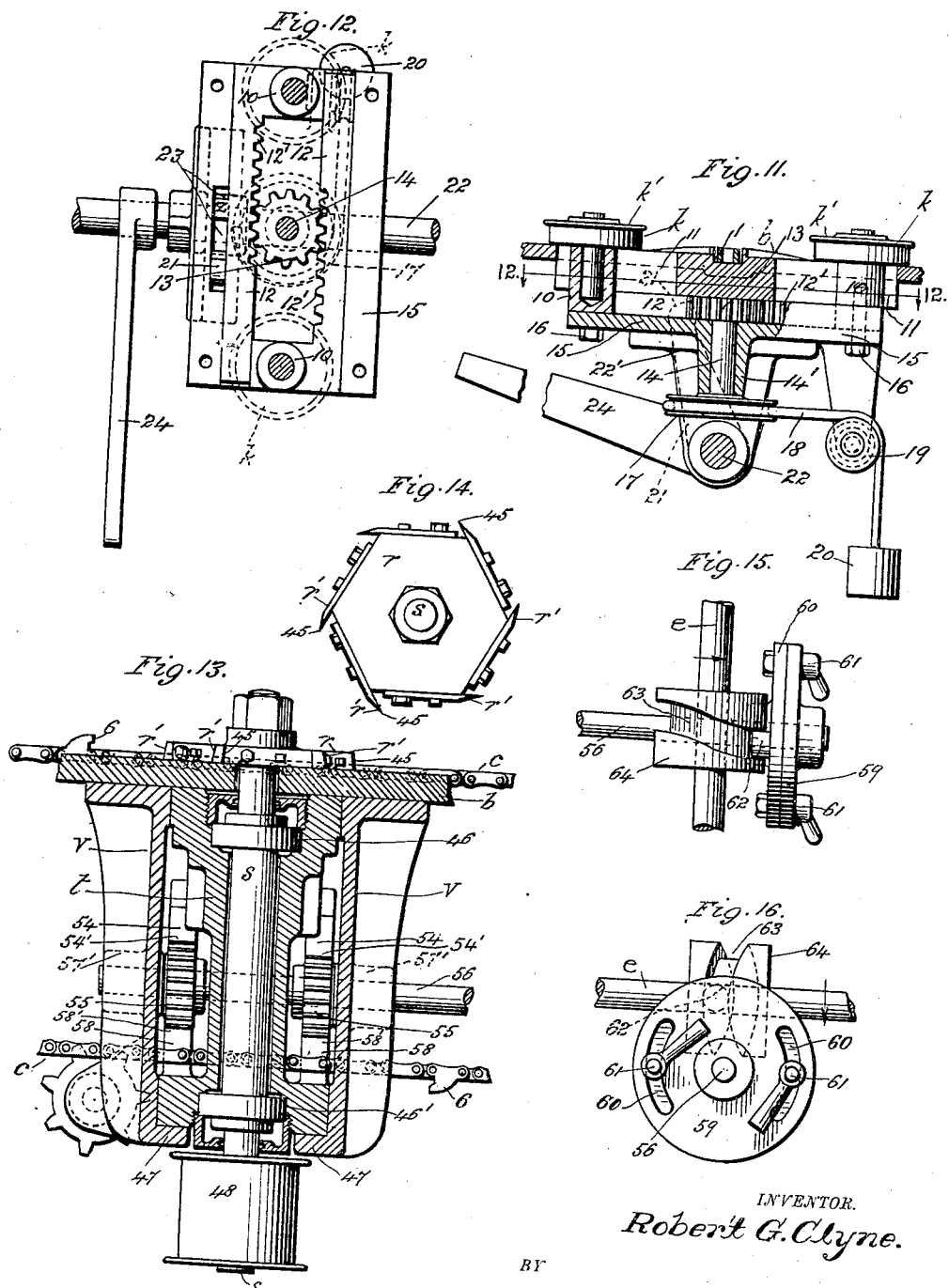

UNITED STATES PATENT OFFICE.

ROBERT G. CLYNE, OF ALTON, ILLINOIS, ASSIGNOR, BY DIRECT AND MESNE ASSIGNMENTS, OF ONE-EIGHTH TO JAMES VAN S. BARRET, ONE-EIGHTH TO CHARLES F. GILBERT, ONE-EIGHTH TO CHARLES R. REED, ONE-EIGHTH TO KITTY RAYBURN, ONE-EIGHTH TO SAMUEL L. RAYBURN, AND ONE-EIGHTH TO WILLIAM GEIST, ALL OF ST. LOUIS, MISSOURI, ONE-EIGHTH TO CONRAD H. MUELLER, OF KIRKWOOD, MISSOURI, AND ONE-EIGHTH TO FRANK D. WYANT, OF EAST ST. LOUIS, ILLINOIS.

STAVE RESAWING AND JOINTING MACHINE.

1,321,285.          Specification of Letters Patent.      Patented Nov. 11, 1919.

Application filed August 23, 1917. Serial No. 187,885.

*To all whom it may concern:*

Be it known that I, ROBERT G. CLYNE, a subject of the King of Great Britain, residing at Alton, in the county of Madison and State of Illinois, have invented a new and useful Improvement in Stave Resawing and Jointing Machines, of which the following is a specification.

My invention relates to a machine for re-sawing and jointing barrel staves and has for its object to combine the different operations hitherto performed by separate machines, in a single machine, whereby a more accurate stave is produced at a reduced cost.

It consists in features of novelty as hereinafter described and claimed, reference being had to the accompanying drawing forming part of this specification, whereon, Figure 1, is a top plan view of my improved stave re-sawing and jointing machine and Fig. 2, a side elevation thereof; Fig. 3, a vertical transverse section to enlarged scale through the machine on line 3, 3, in Fig. 1; Fig. 4, a vertical longitudinal section to enlarged scale through part of the machine on line 4, 4, in Fig. 3, showing one of the two opposite saw blades and its adjusting device forming parts of my invention; Figs. 5, and 6, vertical transverse sections to enlarged scale through the machine on lines 5, 5, and 6, 6, respectively, in Fig. 1; Fig. 7, a perspective view of a stave in the rough preparatory to its being passed through the machine; Figs. 8 and 9, an end view and a perspective plan view respectively, of the stave when re-sawed and jointed after being passed through the machine; Fig. 10, a peripheral view to enlarged scale of one of the stave nurling rollers forming part of my invention, Fig. 11, a vertical sectional elevation to enlarged scale through the stave guide or alinement rollers with their adjusting device forming parts of my invention, on line 11, 11, in Fig. 1; and Fig. 12, a horizontal section thereof on line 12, 12, in Fig. 11; Fig. 13, a vertical section to enlarged scale through the housing and supporting brackets for one of the two opposite edge cutter heads with its drive pulley (shown in elevation) and their adjusting device forming parts of my invention; Fig. 14, a top plan view of the cutter head seen in Fig. 13, detached; Fig. 15, a top plan view to enlarged scale of the cam device forming part of my invention for moving the cutter heads to and from each other and Fig. 16 an end view thereof; Fig. 17, a side elevation to enlarged scale of one of the stave holding down rollers forming part of my invention and Fig. 18, a vertical cross section thereof on line 18, 18, in Fig. 17; Fig. 19, a side view to enlarged scale of part of the stave conveyer chain seen in Figs. 1 and 2 with its combined device for engaging the stave, and Fig. 20 a cross section thereof on line 20, 20, in Fig. 19.

Like letters and numerals of reference denote like parts in all the figures.

$a$ represents the frame or support for my improved stave re-sawing and jointing machine (seen particularly in Figs. 1, 2, 3, 4 and 6) having the table $b$, in the top of which along its longitudinal center and for its entire length, is formed a channel or groove 1 for receiving the upper part of an endless conveyer chain $c$ (or analogous band) which is composed of suitably shaped and jointed links 2, 2', as seen particularly in Figs. 19 and 20, and having its upper edge flush with the top of the table $b$ which is convex-shaped transversely corresponding to the transverse curvature of the underside of a stave to be passed through the machine, the chain $c$ passing at the receiving end $x$ of the table $b$ around a sprocket wheel $d$ journaled in the frame $a$, and at the delivery end $y$ of the table $b$ around a similar sprocket wheel $d'$ which is fixed on a transversely arranged shaft $e$ mounted in suitable bearings 3 in the frame $a$. To the shaft $e$ on the outside of the frame $a$ is fixed a toothed spur wheel $f$ which is engaged by a pinion $f'$ fixed on a transversely arranged counter shaft $g$ mounted in suitable bearings 4 in the frame $a$ beneath the shaft $e$, and on the shaft $g$ is fixed a pulley $h$ driven by the belt 5 (and provided with a clutch as hereinafter particularly referred to) for moving the chain $c$ in the direction indicated by the arrows seen in Figs. 1 and 2. Projecting from the outer edge of the conveyer chain $c$ at suitable intervals along the same is a series of lugs or catches 6 which are respectively, adapted to engage and carry with the chain $c$ one of the staves to be passed through the machine as hereinafter more particularly referred to, each lug 6 being preferably, integral with a corresponding link 2 of the chain $c$ as shown, or otherwise as desired.

On the table $b$ at a suitable distance from each end thereof are mounted two vertically revoluble rollers $i$ (see particularly Figs. 17 and 18) having their faces opposite to each other in parallel planes at a suitable and equal distance respectively from each side of the channel 1 and longitudinal center of the table $b$, each roller $i$ being mounted in a guide block 7 which is vertically movable against a spring 8, in a bracket 9 fixed at its base to the table $b$ by bolts 10, or otherwise, so that, while the roller $i$ is normally held peripherally at a minimum distance from the top of the table $b$, it is free to be raised therefrom by the stave when passing through the machine, the particular function of the rollers $i$ being to press down on and eliminate any warp or irregularity in the outer convex surface of the stave as hereinafter more particularly referred to.

Along the table $b$ at suitable intervals between the rollers $i$ and beyond the latter toward the delivery end $y$ of the table $b$, is mounted a series of horizontally revoluble rollers $k$ (see particularly Figs. 11 and 12) which are horizontally arranged in pairs face downward, and formed respectively with an upper peripheral flange or lip $k'$, the rollers $k$ of each pair being peripherally opposite to each other in the same horizontal plane at a suitable and equal distance respectively, from each side of the channel 1 and longitudinal center of the table $b$, and the rollers $k$ of each pair being horizontally yieldable to and from each other according to the width of the stave when passing between them through the machine as hereinafter more particularly referred to; for this purpose the rollers $k$ of each pair are respectively journaled in a preferably circular-shaped bearing or sleeve 10 which passes through a slotted opening 11 formed vertically through the table $b$, and is formed beneath the latter with a horizontally projecting arm 12, the two arms 12 of each pair of rollers $k$ extending therefrom in opposite directions and in the same horizontal plane.

On the inner face of each arm 12 is a vertical toothed rack 12' the two opposite racks 12' being engaged by a toothed pinion 13 which is fixed to the upper end of a vertical shaft 14 journaled in a bearing 14' depending from a plate 15, on which the bearings or sleeve 10 with their arms 12 and rack 12' are slidably supported, the plate 15 being secured by screws 16, or otherwise, to the underside of the table $b$ as shown.

To the lower end of the pinion shaft 14 is fixed a horizontally revoluble sheave 17 around which passes a cord 18 extending horizontally therefrom over a vertically arranged pulley 19 and attached at its dependent end to a weight 20, whereby the pinion 13 engaging the racks 12' is caused to rotate so as to move the rollers $k$, unless otherwise constrained, toward each other, this movement being limited to a predetermined minimum distance between the rollers $k$ by a lever 21 which is fixed on a horizontal shaft 22 extending longitudinally with the machine, beneath the table $b$, to a sufficient length for carrying the levers 21 of the entire series of rollers $k$ as seen in Fig. 2, the shaft 22 being mounted in suitable bearings 22' fixed to the underside of the table $b$.

The free end of the lever 21 projects through a slot 23 (Fig. 12) in the plate 15, the slot 23 being sufficiently long for allowing play to the lever 21 and to a stud $z$ which projects from the adjacent arm 12 into the slot 23 and across the path of the lever 21, and on the shaft 22 is fixed a hand lever 24 by which the lever 21 can be thrown over or adjusted nearer to or farther from, the projection $z$ which, as the arms 12 are moving will come against the lever 21, and the latter in its adjusted position thereby operates to stop the inward movement of the rollers $k$ toward each other accordingly at their required distance apart. The hand lever 24 may be fixed in its adjusted position by a stud 25 projecting therefrom through a slot 25' in the bracket 26, and provided outside the latter with a lock-nut 27 as shown in Fig. 6, or in any other suitable manner.

The particular function of the rollers $k$ is to guide and maintain a steady alinement of the stave when passing between their peripheries in the operation of the machine, their upper flanges or lips $k'$ in so doing, overlapping the side edges of the stave and so maintaining the downward position of the latter on the table $b$.

In the table $b$, preferably at a suitable distance from the second pair of rollers $k$ at the receiving end $x$ of the table $b$, are mounted two circular saws $m$ (see particularly Figs. 3 and 4) which are vertically revoluble side by side, in parallel planes, at a suitable and equal distance respectively, from each side of the channel 1 and longitudinal center of the table $b$, the purpose of the saws $m$ being for resawing the side edges of the stave when passing between them in the rough, previous to forming the bevel and bulge on the said edges by the cutters hereinafter described. Each saw $m$ partly projects above the table *b* through a slotway 28 (Fig. 1) formed therethrough, its hub 29 being feathered on a spindle 30 having a suitable bearing 31 in the frame *a* beneath the table *b*, and on the outer end of the spindle 30 is fixed a pulley 32 which is driven preferably, by a belt 33 from a drive pulley 34 fixed on a transversely arranged shaft 35 having suitable bearings 36 in the frame *a* adjacent to the receiving end *x* of the table *b*, the shaft 35 having an outer drive pulley 35' which is driven in any suitable manner from the outside of the machine. The hub 29 of each saw *m* is formed on its outer side with a circumferential groove 37 adapted to be engaged by the outer forked end of an arm 38 which is screw-threaded through its other end and mounted thereat on a correspondingly screw-threaded portion of a horizontally arranged spindle 39 having suitable bearings 40 in the frame *a*, the two screw-threaded portions of the spindle 39 for the two saws *m* being respectively, right and left handed, and to the outer end of the spindle 39 is fixed a hand wheel 41, whereby, on rotating the spindle 39 in one direction the saws *m* will be moved toward each other and vice versa according to the distance between them required by the width of the stave to be sawed. Combined with each saw *m* is preferably, a wedge *n* (Figs. 1, 2 and 4) having its apex in the same plane as the saw *m* and approximate to, but clear, of its cutting edge, the wedge *n* being fixed to and adjustable with the arm 38 for intercepting and throwing or removing the listings or shavings cut from the stave, outwardly from the machine.

Above the table *b* at a suitable distance therefrom and parallel thereto between and clear of the saws *m*, is arranged a flat sheet metal bar *o* (Figs. 2, 3, and 4) having its end nearest to the receiving end *x* of the table *b* flared or inclined upward for insuring the free entrance thereat of a stave to the space between the table *b* and the bar *o* which is adapted to press downward on and steady the stave in its passage to the saws *m*.

To the table *b* at a suitable distance from each side edge of the bar *o* is fixed an upright bracket *p*, the brackets *p* being opposite and parallel to each other and having opposite slotted openings 42 therethrough at the top for receiving the end portions of horizontal rods 43 (preferably two as shown) which span the brackets *p* and are adapted to move upward and downward in the openings 42. To each rod 43 is hinged the upper end of a sheet metal bar 44 which is inclined toward and attached at its lower end to the upper side of the bar *o*, by which construction the bar *o* is rendered resilient so that, when staves of varying thickness are passed between it and the table *b* in the operation of the machine, the bar *o* will be raised or lowered accordingly and maintain its pressure on the stave in its passage to the saw *m*.

In the table *b* between the vertical rollers *i* and the horizontal rollers *k* adjacent to the delivery end *y* of the table *b* are mounted two horizontally arranged revoluble cutter heads *r* (Figs. 1, 2, 3, 5, 6, 13, and 14) for cutting the bevel and forming the bulge on the side edges respectively of the stave after it has passed between the saws *m*, the cutter heads *r* being peripherally opposite to each other in the same horizontal plane at an equal distance respectively from each side of the channel 1 and longitudinal center of the table *b*. Each cutter head *r* is, in the present case, hexagonal in top plan (Fig. 14) but may be otherwise shaped as desired and of suitable depth or thickness, its lower side being approximate to but clear of the table *b*. To each side of the cutter head *r* is fixed a cutter *r'* having its cutting edge 45 which projects somewhat beyond the angle formed by its said side with the succeeding side of the head *r* bevel-shaped or inclined outwardly from the top of the head *r*, corresponding to the bevel or angle at which the side edge of the stave is to be cut.

Each cutter head *r* is fixed on the upper end portion of a vertically arranged spindle *s* which is mounted in suitable bearings 46, 46', formed respectively in the upper and lower end portions of a tubular sleeve or housing *t* in which the spindle *s* is inclosed and adapted to freely revolve.

To the underside of the table *b*, transversely thereto, are fixed at their upper ends two opposite and parallel vertically depending brackets *v* having respectively, an inner horizontal bottom flange 47, the housings *t* being supported by, and adapted to ride at their lower ends on the flanges 47 between the inside faces of the brackets *v* which operate as guides to the housings *t*. To the lower end of the spindle *s* is fixed a drive pulley 48 from which a belt 49 passes around a pulley 50 which is fixed on a transverse shaft 51 mounted in suitable bearings 52 in the frame *a* at the receiving end *x* of the table *b*, and having an outer drive pulley 53 which is driven by any suitable means, (not shown), the pulley 50 being sufficiently wide to allow of the lateral play thereon of the belts 49 when the cutter heads *r* are adjusted to and from each other as hereinafter more particularly described.

From opposite sides respectively of one of the housings *t* seen to the right in Fig. 5 and through which the section shown in Fig. 13 is taken, projects an arm 54, the two arms 54 being parallel to each other and extending across the longitudinal center of the table *b*, and somewhat beyond and clear of the corresponding opposite sides of the other housing $t$ where each arm 54 is formed on its underside with a toothed rack 54' which is adapted to be engaged by a toothed spur pinion 55 fixed on a shaft 56 which extends therefrom, longitudinally with the machine, to the delivery end $y$ of the table $b$, the shaft 56 being mounted thereat in a suitable bearing (not shown) in the frame $a$ and at its other end, having the pinions 55, in bearings 57 formed in the brackets $v$ as seen in Fig. 13.

Similarly, at opposite sides respectively of the said other housing $t$ is a projection 58 on the bottom of the housing $t$, which is the equivalent of the arm 54 before described, and on the upper side of the projection 58 is a rack 58' which is also engaged by the pinion 55, so that, on rotating the latter by its shaft 56 the cutter heads $r$ will be moved to or from each other as follows:—On the end of the shaft 56 at the delivery end $y$ of the table $b$ is fixed a circular disk 59 which is adjustably clamped to a similar disk 60 by lock-bolts 61 carried by the disk 60 and passing through slots 61 in the disk 59 as shown, the disk 60 being pivoted loosely on the shaft 56 and having a pin or stud 62 projecting from its outer face and adapted to engage in a cam-shaped groove 63 formed in the periphery of a circular block 64 fixed on the shaft $e$ of the chain driving sprocket wheel $d'$, the rotary throw or stroke of the pin 62 with the disk 60, due to the eccentricity of the groove 63 on a complete revolution of the block 64 and shaft $e$, causing the shaft 56 to be partially rotated and returned to its normal position, whereby, the toothed pinion 55 on the shaft 56 being similarly rotated causes the cutter heads $r$ to be moved to and from each other during the complete passage of the stave between them, to an extent corresponding to the difference in width between the ends and middle of the stave. By shifting the rotary position of the disk 59 with the shaft 56 relatively to that of the disk 60 and its pin 62, and re-clamping the disk 60 to the disk 59, the distance initially between the cutter heads $r$ will be correspondingly increased or lessened according to the varying widths of the staves to be shaped by the cutter heads $r$.

Along the table $b$ between its delivery end $y$ and the adjacent alinement rollers $k$ are mounted a pair of horizontally arranged rollers $w$ between which the stave finally passes from the machine and which are similar in every respect to the rollers $k$ before described, except that their peripheries are preferably corrugated or knurled transversely as seen particularly in Fig. 10, for correspondingly corrugating the beveled side edges of the stave, whereby the staves when assembled to form a barrel are prevented from sliding edgewise along each other, and it is here noted that the peripheries of the rollers $k$ and $w$ between the cutter heads $r$ and the delivery end $y$ of the table $b$ are inclined inward from the top corresponding to the beveled side edges of the stave after leaving the cutter heads $r$.

The hub 65 of the chain drive pulley $h$ is provided at its outer side with a clutch 66 which is operated by a hand lever 67 hinged at its fulcrum to a horizontal rod 68 (Figs. 1 and 3) which extends therefrom, longitudinally with the machine, to the receiving end $x$ of the table $b$, the rod 68 being mounted in suitable bearings 69, 69', respectively, carried by the frame $a$, the hubs 70, 71, of the saw drive pulley 35' and the cutter head drive pulley 53 respectively, also having clutches 72, 73, which are similar to the clutch 66 of the chain drive pulley $h$ and operated by hand levers 74, 74', and by an auxiliary lever 75 fixed on the rod 68 at the receiving end $x$ of the table $b$, so that, in the case of any obstruction or accidental check to the free passage of the stave along the table $b$, the machine can be stopped by throwing over either of the said levers and thereby simultaneously releasing the clutches 66, 72, and 73, from their respective drive pulleys.

In the operation of the machine, assuming the chain $c$ with its lugs or catches 6 to be traveling in the direction indicated by the arrows seen in Figs. 1 and 2, and rotation being imparted to the saws $m$ and the cutter heads $r$, a stave $a'$ in the rough (seen particularly in Fig. 7), is placed on the table $b$ and chain $c$ with its rear end hard against one of the lugs or catches 6 of the latter, as indicated by dotted lines in Fig. 2, and is carried thereby along the table $b$ between it and the first pair of holding down rollers $i$, which press downward on the stave and so straighten or eliminate any warp therein, the stave $a'$ thence passing between the adjacent alinement rollers $k$, and thence between the bar $o$ and the table $b$ to the revolving saws $m$ which re-saw the rough side edges of the stave $a'$ to its finished width at the middle for its entire length. On leaving the saws $m$ the stave $a'$ passes between succeeding alinement rollers $k$ and thence beneath the second pair of holding down rollers $i$ to the cutter heads and cutters $r$, $r'$, by which the finished bevel and bulge, or longitudinal convexity, are given to the side edges of the stave $a'$ (as seen particularly in Figs. 8 and 9), the stave $a'$ on leaving the cutter heads and cutters $r$, $r'$, passing between succeeding alinement rollers $k$ and thence between the nurling rollers $w$, from which the finished stave $a'$ is delivered from the machine ready to use.

It is to be here noted that, although the above description applies only to a single stave, a series of staves may be passed through the machine successively; also, that the number and spacing of the rollers $i$, $k$, and $w$, and the location of the saws $m$ and cutter heads $r$ may be otherwise arranged without departure from the principle of my invention.

I claim:

1. In a machine for shaping staves the combination of a table having an upper surface that is convex transversely to correspond approximately to the desired transverse curvature of the inside of the staves being shaped, a pair of opposite rollers independently movable toward and from the table and arranged to bear upon the edges of the stave while resting on the convex part of the table, yielding means to force the rollers independently against the stave and cause it to take the curvature of the table and a conveyer for acting on the stave to force it longitudinally through the machine.

2. In a machine such as described in claim 1, and in combination with the elements therein recited, means acting on the edges of the stave, after the rollers have forced it into engagement with the convex part of the table, for maintaining the stave curved and in engagement with the convex part of the table as it is being advanced through the machine.

3. In a machine of the character described, the combination of a frame, a table on the frame, a conveyer for the stave, means for moving the conveyer along the table, two opposite horizontally revoluble rollers journaled in suitable bearings and adapted to bear peripherally against the side edges of the stave, a plate fixed on the table and adapted to support the said bearings slidably thereon, a vertically toothed rack projecting horizontally from each of the said bearings, the said racks being opposite to each other, an upright shaft, a bearing for the shaft in the said plate, a pinion fixed on the shaft and adapted to engage the said racks, means for automatically moving the said rollers with their bearings toward each other, and means for limiting the said movement.

4. In a machine of the character described, the combination of a frame, a table on the frame, a conveyer for the stave, means for moving the conveyer along the table, two opposite horizontally revoluble cutter heads, an upright spindle fixed to each of the said heads, bearings for the spindle, a housing for the spindle and its bearings, means for rotating the spindle, two opposite upright brackets dependent from and fixed to the table and adapted to support the housings slidable with the said heads; to and from each other thereon, a horizontally toothed rack projecting from each of the said housings, the said racks being opposite to each other, a shaft, a pinion fixed on the shaft and adapted to engage the said racks, and means for rotatably oscillating the said shaft and pinion to a predetermined extent.

ROBERT G. CLYNE.

Copies of this patent may be obtained for five cents each, by addressing the "Commissioner of Patents, Washington, D. C."